Patented Aug. 19, 1952

2,607,701

UNITED STATES PATENT OFFICE 2,607,701

GLASS COLOR VEHICLE

Christian C. Jessen, Perth Amboy, N. J., assignor to E. I. du Pont de Nemours & Company, Wilmington, Del., a corporation of Delaware No Drawing. Application March 2, 1949, Serial No. 79,301

2 Claims. (Cl. 106—123)

This invention relates to vehicles for glass colors, and more particularly it relates to such vehicles which are solid at room temperature but melt readily at a temperature slightly above room temperature.

Glass colors, composed of inorganic pigments and finely ground glass, have long been used in the decoration of ceramic (glass, china, porcelain, etc.) and metal objects. For many years, glass colors were mixed with suitable solvents, viscosifying and dispersing agents to form a plastic mass which was applied, in the desired design, to a ceramic or metal object by squeegeeing the same through a screen stencil. The stenciled design was then solidified by removal of the solvent and fired to fuse the glass color to the object.

This formerly known process was operated with a great deal of success; however, it was necessarily slow by reason of the time required to remove the solvents from the applied color design. This was particularly annoying when it was desired to apply multi-color designs by superimposing, in registry, several different colors in succession on an object.

It has, more recently, been suggested to prepare glass color squeegee compositions by mixing the glass colors with a vehicle that is solid at room temperature but will readily melt at a temperature slightly above room temperature. It was contemplated that such compositions would be applied in their molten state and allowed to solidify by cooling to below their melting point.

It is an object of this invention to produce a vehicle for glass colors which will solidify rapidly at room temperature.

It is another object of this invention to produce a vehicle for glass colors which will melt at a temperature of about 120° F. to 212° F., and which will solidify rapidly at room temperature.

It is still another object of this invention to produce a glass color squeegee composition which may be applied in successive superimposed layers by means of a squeegee stencil with great rapidity.

Other objects of the invention will appear hereinafter.

The above objects may be accomplished in accordance with the present invention by employing a glass color vehicle comprising 20% to 98% of a wax or wax-like material, or mixture of wax and wax-like material, having a melting point between 120° F. and 212° F., 2% to 15% of ethyl cellulose, 0% to 55% of rosin or rosin derivative, and 0% to 20% lecithin or phosphorated tall oil. A glass color comprising 5% to 20% inorganic oxide pigment and correspondingly 95% to 80% finely ground glass frit may be mixed in a proportion of glass color to vehicle of 1:1 to 4:1 with the above-said vehicle to produce a glass color squeegee composition which may be applied at a temperature of between 120° F. and 212° F. to a ceramic or metal object through a screen stencil. The glass color squeegee composition will solidify almost immediately after withdrawal of the screen stencil. By the use of the composition of this invention it is possible to superimpose a number of different glass colors in quick succession on an object to produce intricate multi-color designs.

By the expression "wax or wax-like material, or mixture of wax and wax-like material, having a melting point between 120° F. and 212° F." is meant any wax, for example, carnauba wax, paraffin wax, microcrystalline wax, spermaceti, or beeswax, as well as materials having the characteristics of wax such as non-tacky solidity at room temperature but readily fusible at the above-said temperature range. As examples of wax-like materials, palmitic acid, stearic acid, and solid soaps may be named. The wax or wax-like material, or mixture of wax and wax-like material, will preferably constitute the bulk of the vehicle and is preferably present within the range of 60% to 85%.

The ethyl cellulose is present as a viscosity promoting substance to improve the application properties and to function as a hardening agent for the vehicle. The ethyl cellulose must be present in such amount as to constitute 2% to 15% of the vehicle composition, and it is preferably present in an amount between 3% and 10% of said composition.

The rosin or rosin derivative is present in the vehicle for the purpose of giving hardness to the composition, to act as a binder to adhere the glass color composition to the object, and to aid in making the ethyl cellulose dissolve in the wax or wax-like material. Although the rosin is not an essential ingredient in the vehicle composition, the best compositions will contain at least 5%, and preferably between 5% and 25%, of rosin or rosin derivative. Unmodified rosin may be used or any resinous rosin derivative, for example, zinc-hardened rosin, hydrogenated rosin, rosin esters, or abietic acid esters such as methyl abietate, or polymers of the resin acids of rosin, i. e., "poly-pale" resin, a resin prepared by polymerizing the unsaturated resin acids contained in rosin, e. g., pimaric and abietic acids. A full description of "poly-pale" resins is found in the 2nd edition—July 1942—Bulletin issued by the Naval Stores Department of the Hercules Powder Company of Wilmington, Delaware.

The lecithin or phosphorated tall oil is preferably present in the composition as a dispersion control agent whereby to aid in controlling the application thickness of the glass color composition to an object. Although lecithin or phosphorated tall oil are not essential ingredients, it is preferred, in order to obtain best results, that these substances be present within the range 5% to 10%, based on the weight of the vehicle.

Glass colors for admixture with vehicles to print or squeegee through screen stencils are well known in the art. Such glass colors generally consists of 5% to 20% of inorganic oxide pigments and correspondingly 95% to 80% of finely divided glass particles. Usually lead-borosilicate glass is employed as the glass particle ingredient of the glass colors.

The improved glass color vehicle of this invention has particular utility in the rapid application of glass colors to objects prior to firing thereof. The vehicle has the advantage of application of glass colors in thin, uniform layers which may be fired without running together of the colors. The glass color compositions containing the vehicle of this invention may be shipped as solid pellets or particles which, when melted, have a consistent viscosity and adherence to the objects to be decorated.

The following examples are given to illustrate in detail several preferred glass color vehicles of this invention. It is to be understood that the specific details given in the examples are not to be considered as limiting the scope of the invention.

Example I 42.6 parts of paraffin (melting point 125° F. to 130° F.), 6.39 parts of ethyl cellulose (185 centipoises, ethoxyl content of 48.5% to 50.0%), and 42.5 parts of hydrogenated rosin were heated together at a temperature between 212° F. and 302° F. until homogeneous. Then, 8.51 parts of the polymer of the unsaturated isomeric resin acids of rosin were stirred into the molten mass at the same temperature until the several ingredients have become completely dissolved. The mass is then cooled to room temperature. The above-said mass constitutes a vehicle which may be mixed, at a temperature between 212° F. and 302° F. with a glass color in the proportion of one part of said mass to one to four parts glass color to produce a composition which may be squeegeed through a screen stencil at a temperature between 120° F. and 212° F. and will solidify at room temperature.

Example II 17.85 parts of stearic acid, 35.71 parts of paraffin (melting point 125° F. to 130° F.), 3.57 parts of ethyl cellulose (185 centipoises, ethoxyl content of 48.5% to 50.0%), and 17.86 parts microcrystalline wax (melting point 190° F. to 195° F.) were heated together at a temperature between 212° F. and 302° F. until homogeneous. While the mass was being maintained at the above-mentioned temperature, 17.86 parts of carnauba wax #3 was stirred in and the heating continued until the mass was again homogeneous. Subsequently, 7.15 parts of lecithin were added to the mass while stirring the same and maintaining it at the same temperature. The mass soon became homogeneous after which it was allowed to cool, and constituted a vehicle for a glass color in the same manner as stated in Example I.

Example III 27.78 parts of stearic acid, 55.56 parts of spermaceti wax, and 5.55 parts of ethyl cellulose (185 centipoises, ethoxyl content 48.5% to 50.0%) were heated together at a temperature between 212° F. and 302° F. until the mass became homogeneous. Then, 11.11 parts of lecithin were stirred into the mass while being maintained at the same temperature. The mass soon became homogeneous, after which it was allowed to cool to room temperature, and constituted a vehicle for a glass color in the same manner as stated in Example I.

Example IV 17.9 parts of stearic acid, 3.6 parts of ethyl cellulose (185 centipoises, ethoxyl content of 48.5% to 50.0%), and 35.6 parts of microcrystalline wax (melting point 190° F. to 195° F.) were heated together at a temperature between 212° F. and 302° F. until the mass became homogeneous. Then, 35.6 parts of carnauba wax #3 and 7.3 parts of lecithin were stirred into the mass while maintaining the same at the same temperature. The mass soon became homogeneous after which it was cooled to room temperature for use as a vehicle for a glass color in the manner set forth in Example I.

Example V 27.78 parts of stearic acid and 5.56 parts of ethyl cellulose (185 centipoises, ethoxyl content of 48.5% to 50.0%) were heated together at a temperature between 212° F. and 302° F. until the mass became homogeneous. 55.55 parts of carnauba wax #3 and 11.11 parts of lecithin were then added and the mass stirred while maintaining the same at the same temperature until it again became homogeneous. The mixture was then cooled to room temperature for use as a vehicle for a glass color in the manner described in Example I.

Example VI 15.13 parts of stearic acid, 15.13 parts of spermaceti wax, 15.13 parts of paraffin (melting point 125° F. to 130° F.), 3.11 parts of ethyl cellulose (185 centipoises, ethoxyl content of 48.5% to 50.0%), and 15.13 parts of hydrogenated rosin were heated together at a temperature between 212° F. and 302° F. until the mass became homogeneous. Then, while maintaining the mass at the same temperature, 15.13 parts of microcrystalline wax (melting point 190° F. to 195° F.), 15.13 parts of carnauba wax #3, and 6.11 parts of lecithin were added while stirring the mass until it became homogeneous. The mass was then cooled to room temperature for use as a vehicle for a glass color in the manner described in Example I.

The vehicles described in the above-mentioned examples all have a melting point of between 122° F. and 212° F. A glass color composed of about 10% inorganic pigment and 90% glass frit may be mixed in proportions of 1:1 to 4:1 of the glass color to the vehicle and the resulting glass color composition applied to an object to be decorated through a screen stencil by means of a squeegee process at a temperature between the melting point of the vehicle and about 212° F. In all cases, the glass color composition almost immediately after application solidifies on the surface of the object to give a hard, tack-free coating which may be fired on the object to fuse the glass color and thereby produce a firmly bonded glass color design on the object. If desired, a plurality of glass colors in any desired registry may be superimposed on each other before carrying out the firing operation.

Reference in the specification and claims to parts, proportions, and percentages, unless otherwise specified, refers to parts, proportions, and percentages by weight.

Since it is obvious that many changes and modifications can be made in the above-described details without departing from the nature and spirit of the invention, it is to be understood that the invention is not to be limited to said details except as set forth in the appended claims.

I claim:

1. A solid, substantially non-volatile vehicle having a melting point between about 120° F. and 212° F. for application of glass colors to a base on which they will subsequently be fired, said vehicle comprising 60% to 85% of a wax having a melting point between 120° F. and 212° F., 3% to 10% ethyl cellulose, 5% to 25% of a substance, and mixtures thereof, taken from the group consisting of rosin, zinc-hardened rosin, hydrogenated rosin, abietic acid esters, and "poly-pale" resin, and 5% to 10% of phosphorated tall oil.

2. A glass color composition comprising a mixture of a glass color and a solid, substantially non-volatile vehicle having a melting point between about 120° F. and 212° F. in the proportion of 1:4 parts glass color to one part vehicle, said vehicle comprising 60% to 85% of a wax having a melting point between 120° F. and 212° F., 3% to 10% ethyl cellulose, 5% to 25% of a substance, and mixtures thereof, taken from the group consisting of rosin, zinc-hardened rosin, hydrogenated rosin, abietic acid esters, and "poly-pale" resin, and 5% to 10% of phosphorated tall oil.

CHRISTIAN C. JESSEN.

REFERENCES CITED

The following references are of record in the file of this patent:

UNITED STATES PATENTS

| Number | Name | Date |
| --- | --- | --- |
| 2,094,771 | Charch | Oct. 5, 1937 |
| 2,147,180 | Ubben | Feb. 14, 1939 |
| 2,186,124 | Rash | Jan. 9, 1940 |
| 2,190,210 | Kaber | Feb. 13, 1940 |
| 2,213,252 | Mitchell | Sept. 3, 1940 |
| 2,262,809 | Lieber | Nov. 13, 1941 |
| 2,272,706 | Harnett | Feb. 10, 1942 |
| 2,313,186 | Wiggam | Mar. 9, 1943 |
| 2,379,507 | Deyrup | July 3, 1945 |
| 2,379,974 | Little | July 10, 1945 |

FOREIGN PATENTS

| Number | Country | Date |
| --- | --- | --- |
| 584,142 | Great Britain | Jan. 8, 1947 |